(12) United States Patent
Faruque et al.

(10) Patent No.: US 11,351,946 B1
(45) Date of Patent: Jun. 7, 2022

(54) AIRBAG INFLATABLE BEHIND SEATBACK OF FRONT SEAT

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/174,604

(22) Filed: Feb. 12, 2021

(51) Int. Cl.
  *B60R 21/207* (2006.01)
  *B60R 21/231* (2011.01)

(52) U.S. Cl.
  CPC ...... *B60R 21/207* (2013.01); *B60R 21/23138* (2013.01); *B60R 2021/23146* (2013.01); *B60R 2021/23153* (2013.01)

(58) Field of Classification Search
  None
  See application file for complete search history.

(56) References Cited

U.S. PATENT DOCUMENTS

| | | | |
|---|---|---|---|
| 4,565,535 A * | 1/1986 | Tassy | B60R 21/16 244/121 |
| 4,657,516 A * | 4/1987 | Tassy | B64D 25/00 280/729 |
| 9,308,883 B1 * | 4/2016 | Schneider | B60R 21/231 |
| 9,321,423 B2 | 4/2016 | Jaradi et al. | |
| 9,573,554 B2 | 2/2017 | Nagasawa | |
| 9,896,056 B2 * | 2/2018 | Burczyk | B60R 21/264 |
| 9,994,181 B1 | 6/2018 | Dubaisi et al. | |
| 10,035,484 B2 | 7/2018 | Jaradi et al. | |
| 10,414,371 B2 * | 9/2019 | Zhang | B60R 21/231 |
| 10,632,956 B2 | 4/2020 | Schneider | |
| 2016/0107598 A1 * | 4/2016 | Fischer | B60R 21/207 280/729 |
| 2017/0291566 A1 * | 10/2017 | Karlow | B60R 21/239 |
| 2018/0043852 A1 * | 2/2018 | Fischer | B60R 21/233 |
| 2018/0319358 A1 * | 11/2018 | Schneider | B60R 21/231 |
| 2020/0282942 A1 * | 9/2020 | Yoshimura | B60N 2/427 |

FOREIGN PATENT DOCUMENTS

| | | | | |
|---|---|---|---|---|
| CN | 111670134 A | * | 9/2020 | B60N 2/838 |
| EP | 3421301 A1 | * | 1/2019 | B60R 21/231 |
| WO | WO-2008050656 A1 | * | 5/2008 | B60R 21/01538 |
| WO | WO-2008059719 A1 | * | 5/2008 | B60R 21/2338 |

* cited by examiner

*Primary Examiner* — Faye M Fleming
(74) *Attorney, Agent, or Firm* — Frank A. MacKenzie; Bejin Bieneman PLC

(57) ABSTRACT

A seat for a vehicle includes a seatback having a seat frame. The seat includes an airbag supported on a vehicle-rearward and vehicle-outboard corner of the seat frame. The airbag is inflatable to an inflated position. The airbag includes a cross-vehicle chamber inflatable in a vehicle-inboard direction behind the seatback and a vehicle-outboard chamber inflatable in a vehicle-rearward direction.

20 Claims, 6 Drawing Sheets

AIRBAG INFLATABLE BEHIND SEATBACK OF FRONT SEAT

BACKGROUND

An airbag may be mounted to the seatback of a front seat in a vehicle and is inflatable forward of an occupant in a rear seat. The airbag, for example, may be inflatable between an occupant in the rear seat and the front seat and/or a door of the vehicle. The airbag controls the kinematics of the occupant in the rear seat in vehicle impacts that urge the occupant in a cross-vehicle direction, e.g., side impact, or in the vehicle-forward direction.

DETAILED DESCRIPTION

Figure 1:
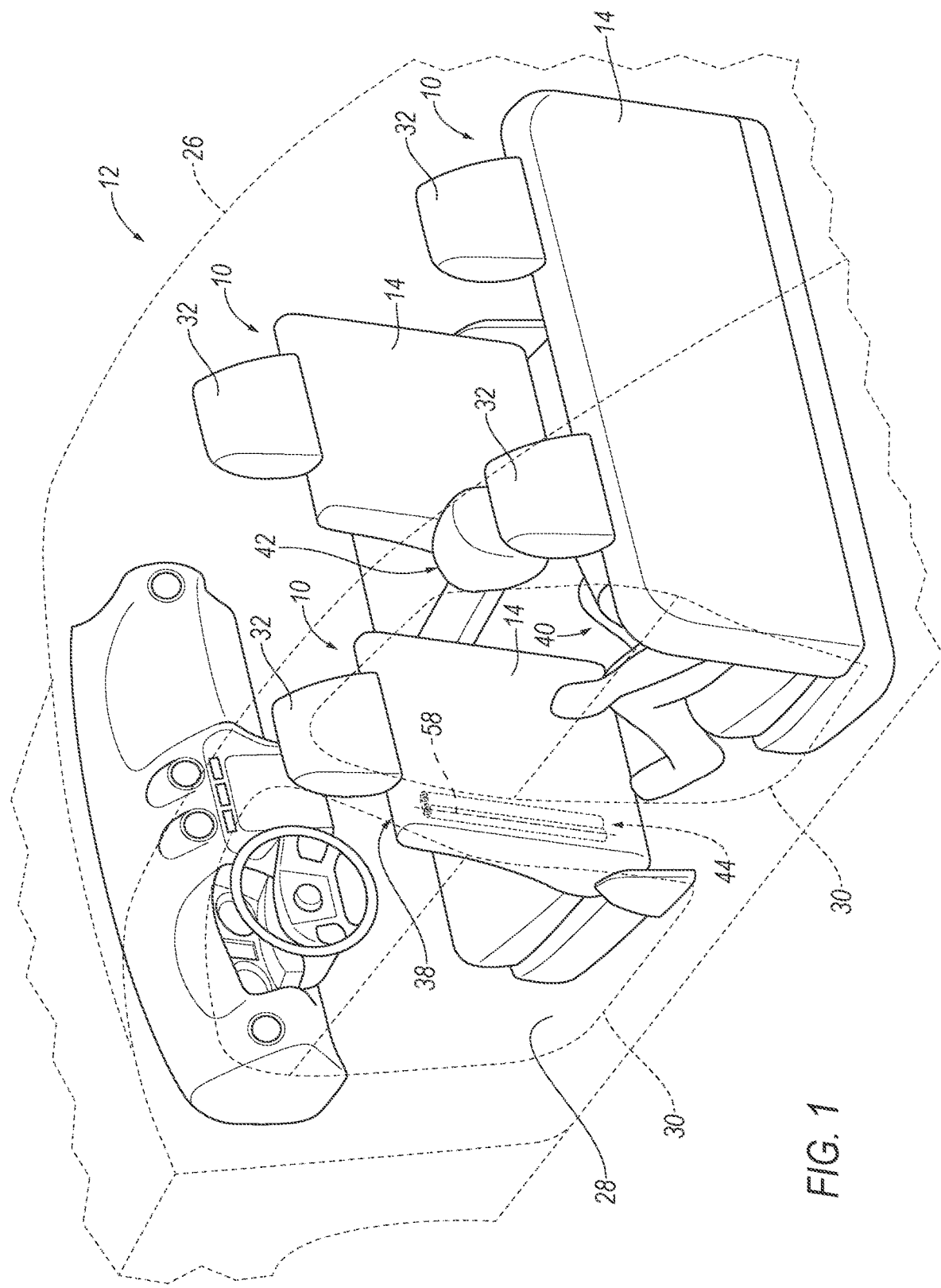
FIG. 1 is a rear perspective view of a vehicle having a front seat including an airbag assembly in an uninflated position behind the front seat.
Figure 2:
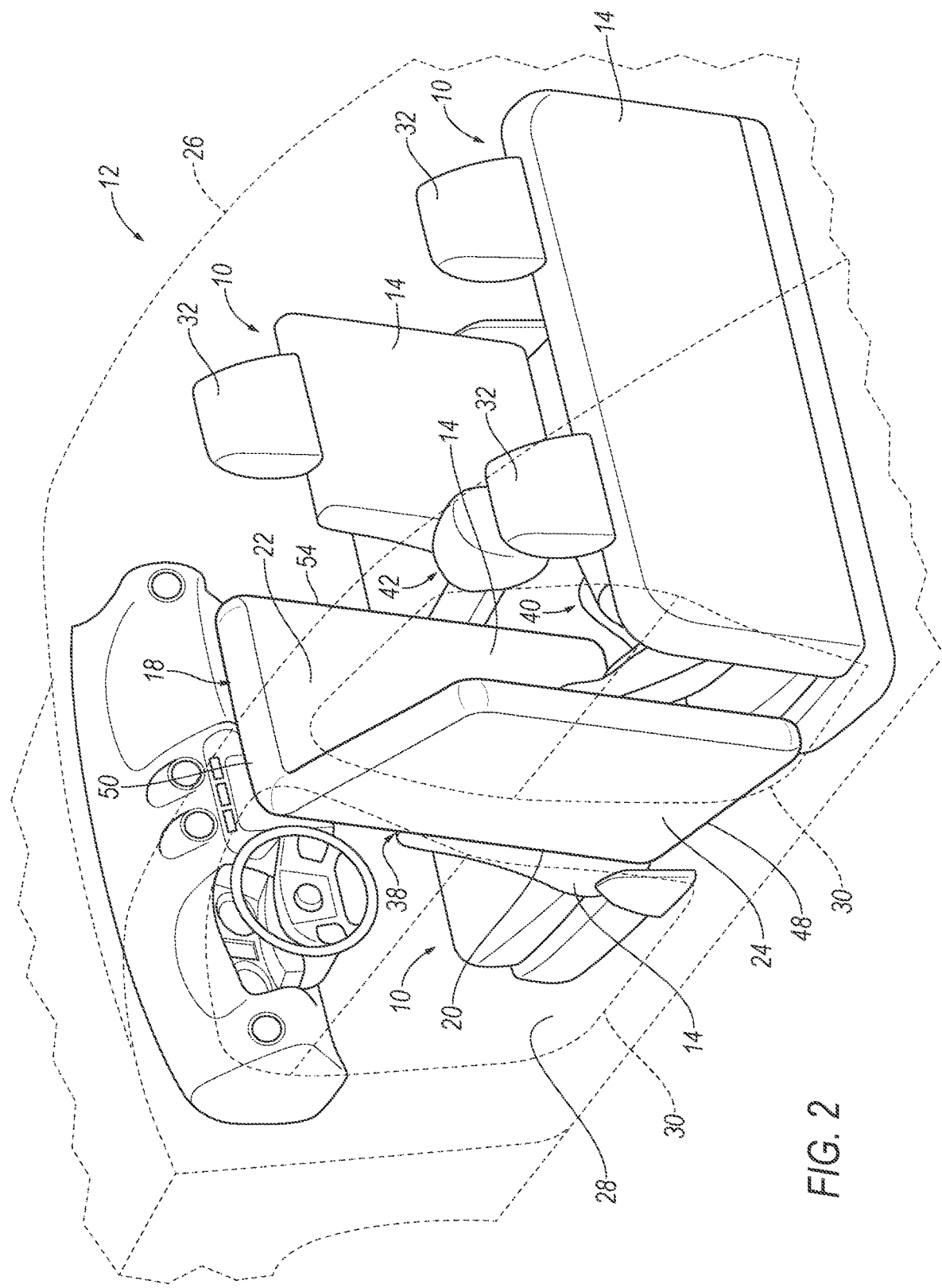
FIG. 2 is a rear perspective view of the vehicle having the airbag assembly in an inflated position behind the front seat.
Figure 3:
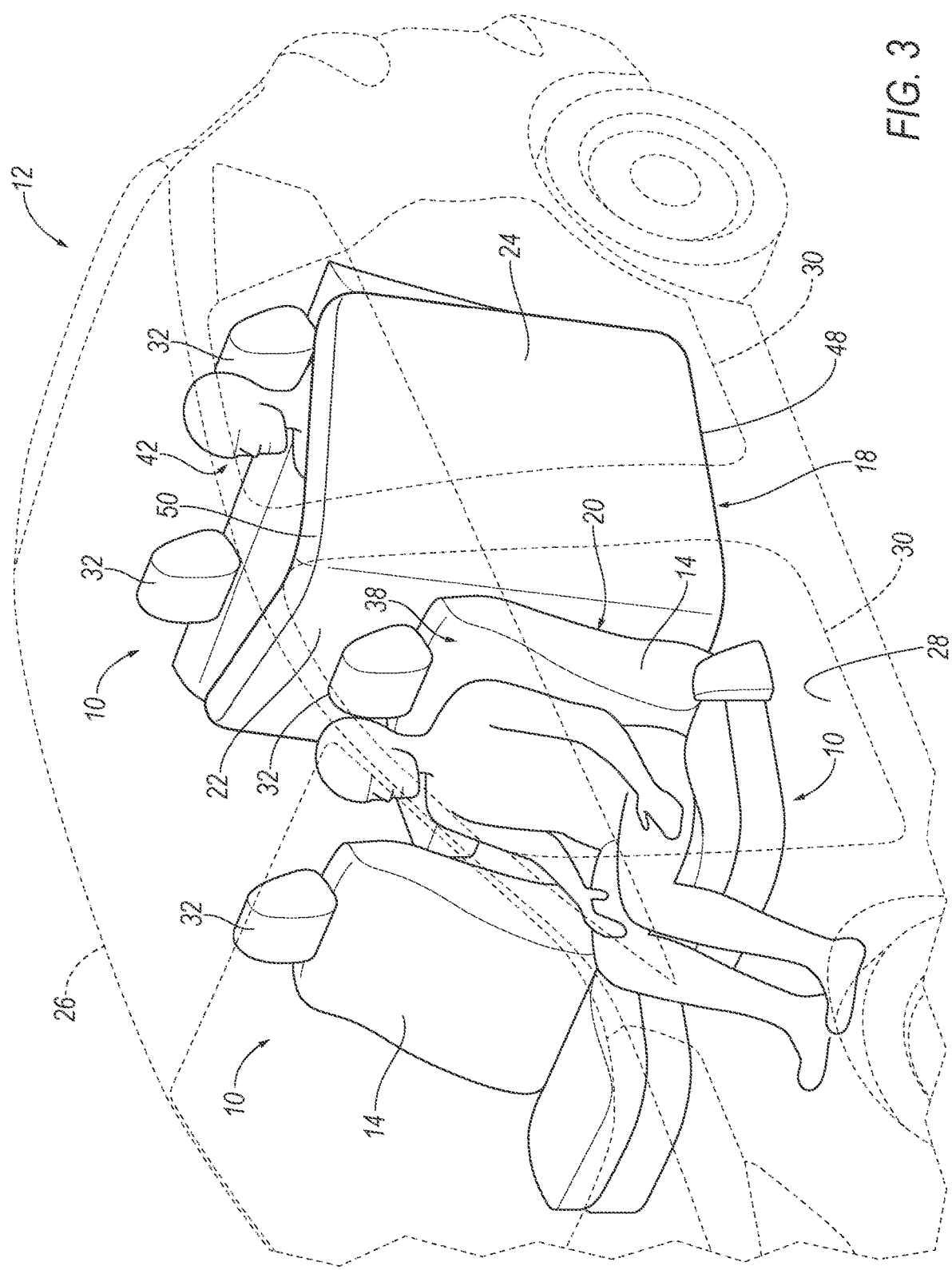
FIG. 3 is a front perspective view of the vehicle having the airbag assembly in the inflated position behind the front seat.
Figure 4:
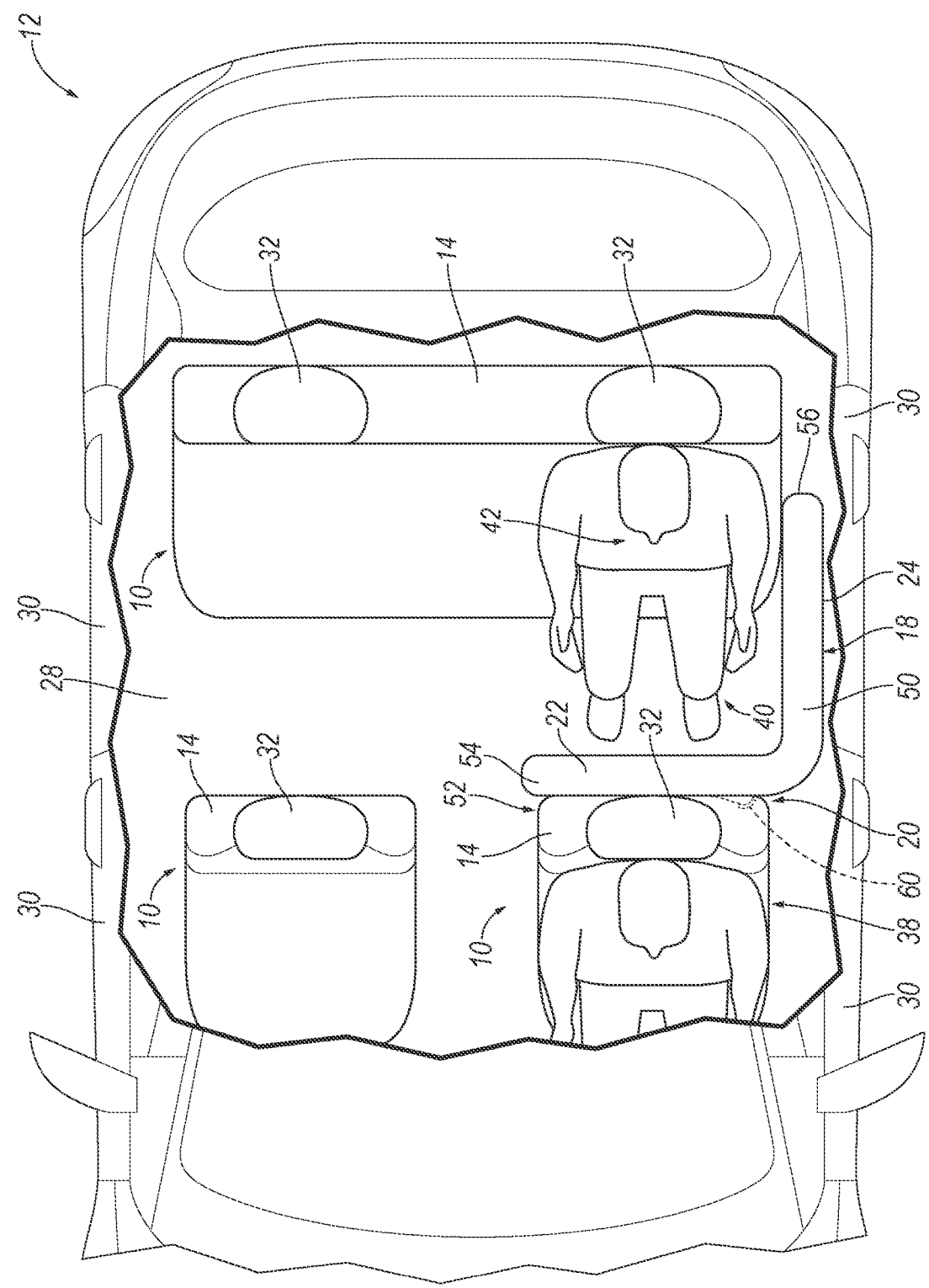
FIG. 4 is a top view of the vehicle including the airbag assembly in the inflated position behind the front seat.
Figure 5A:
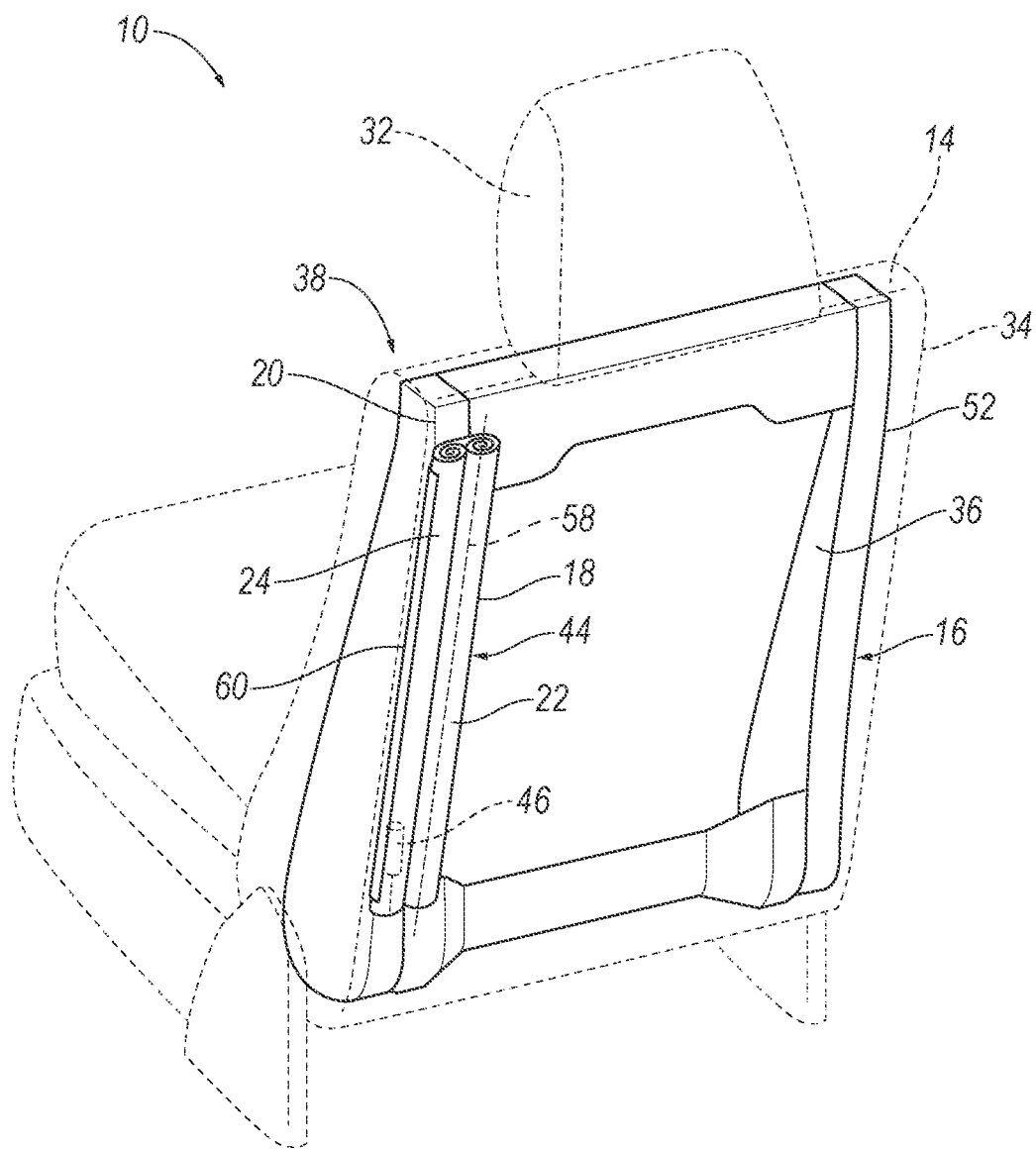
FIG. 5A is a perspective view of the front seat having the airbag assembly in the uninflated position.
Figure 5B:
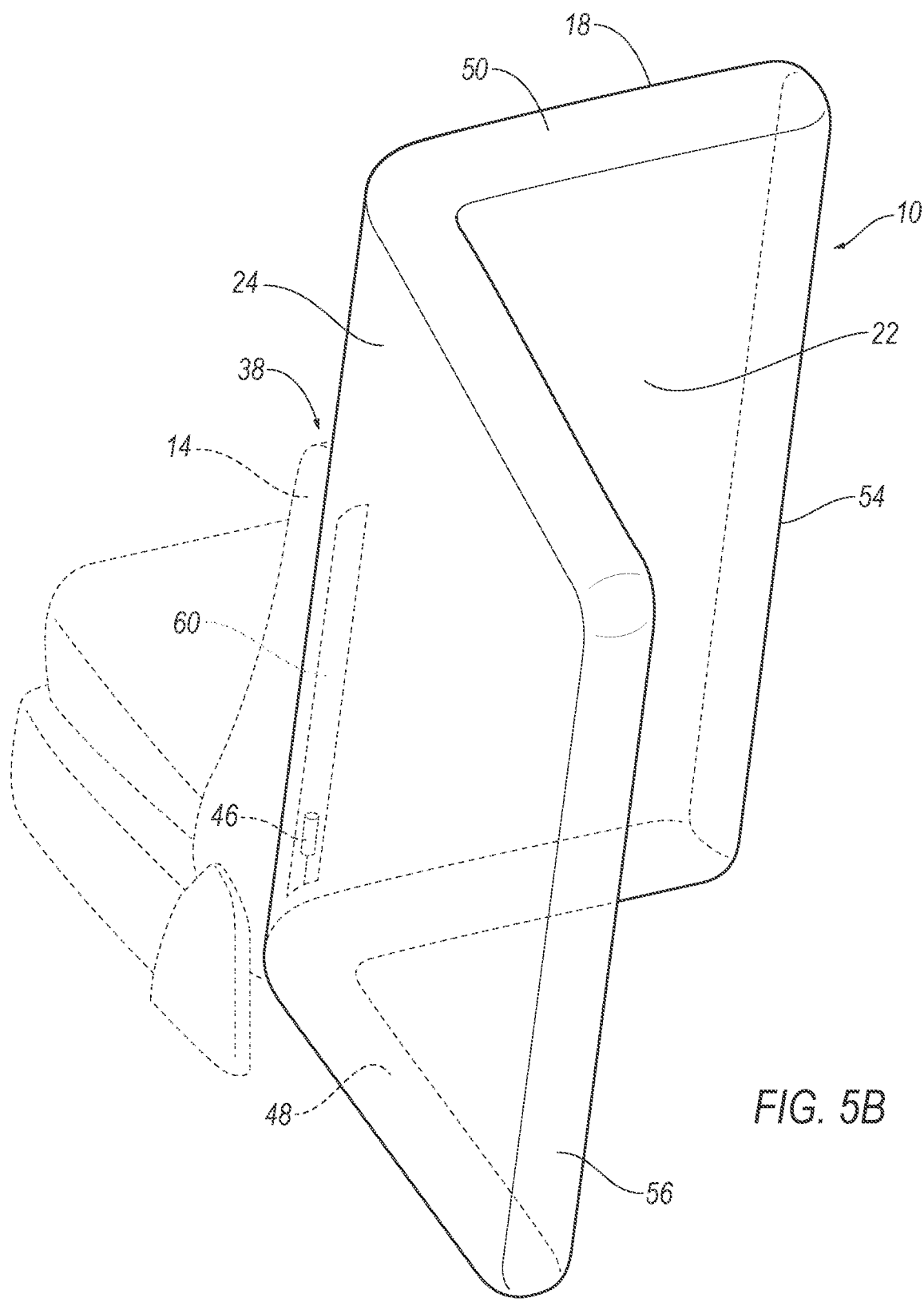
FIG. 5B is a perspective view of the front seat having the airbag assembly in the inflated position behind the front seat.

A vehicle includes a front seat having a seatback, a rear seat spaced from the front seat in a vehicle-rearward direction, an airbag supported on a vehicle-rearward and vehicle-outboard corner of the seatback of the front seat, the airbag being inflatable to an inflated position, and the airbag including a cross-vehicle chamber inflatable in a vehicle-inboard direction behind the front seat and a vehicle-outboard chamber inflatable in the vehicle-rearward direction vehicle-outboard of the rear seat.

The cross-vehicle chamber may extend from the vehicle-rearward and vehicle-outboard corner of the seatback of the front seat to a vehicle-rearward and vehicle-inboard corner of the seatback of the front seat in the inflated position.

The rear seat may include a vehicle-outboard edge, the vehicle-outboard chamber abutting the outboard edge in the inflated position.

The vehicle may include a door adjacent the rear seat, the vehicle-outboard chamber being between the door and the rear seat in the inflated position.

The rear seat may define an occupant knee area, the cross-vehicle chamber being between the front seat and the occupant knee area.

The rear seat may define an occupant head area, the cross-vehicle chamber being between the front seat and the occupant head area.

The cross-vehicle chamber may be fluidly connected to the vehicle-outboard chamber.

The vehicle may include deflector supported by the seatback of the front seat, the airbag abutting the deflector in the inflated position.

The vehicle may include a roof and a floor spaced from the roof, the airbag extending from the floor to the roof in the inflated position.

The cross-vehicle chamber may extend upwardly above the seatback of the front seat in the inflated position.

The front seat may include a head restraint extending upwardly from the seatback, the cross-vehicle chamber extending upwardly above the head restraint in the inflated position.

A seat assembly includes a seatback having a seat frame, an airbag supported on a vehicle-rearward and vehicle-outboard corner of the seat frame, the airbag being inflatable to an inflated position, and the airbag including a cross-vehicle chamber inflatable in a vehicle-inboard direction behind the seatback and a vehicle-outboard chamber inflatable in the vehicle-rearward direction vehicle-outboard of the rear seat.

The cross-vehicle chamber may extend from the vehicle-rearward and vehicle-outboard corner of the seat frame to a vehicle-rearward and vehicle-inboard corner of the seat frame in the inflated position.

The cross-vehicle chamber may be fluidly connected to the vehicle-outboard chamber.

The seat assembly may include an occupant knee area vehicle-rearward of the seatback, the cross-vehicle chamber being between the seatback and the occupant knee area.

The seat assembly may include an occupant head area vehicle-rearward of the seatback, the cross-vehicle chamber being between the seatback and the occupant head area.

The seatback defines an occupant seating area, the seatback being between the cross-vehicle chamber and the occupant seating area when the airbag is in the inflated position.

The seat assembly may include a deflector supported by the seatback, the airbag abutting the deflector in the inflated position.

The cross-vehicle chamber may extend upwardly above the seatback in the inflated position.

The seat assembly may include a head restraint extending upwardly from the seatback, the cross-vehicle chamber extending upwardly above the head restraint in the inflated position.

With reference to the Figures, wherein like numerals indicate like parts throughout the several views, a seat 10 for a vehicle 12 includes a seatback 14 having a seat frame 16. The seat 10 includes an airbag 18 supported on a vehicle-rearward and vehicle-outboard corner 20 of the seat frame 16. The airbag 18 is inflatable to an inflated position. The airbag 18 includes a cross-vehicle chamber 22 inflatable in a vehicle-inboard direction behind the seatback 14 and a vehicle-outboard chamber 24 inflatable in a vehicle-rearward direction.

In the event of an impact to the vehicle 12, the airbag 18 inflates behind the seatback 14. Specifically, the cross-vehicle chamber 22 and the vehicle-outboard chamber 24 inflate behind the seatback 14. The cross-vehicle chamber 22 inflates away from the vehicle-rearward and vehicle-outboard corner 20 of the seat frame 16 in the vehicle-inboard direction, i.e., toward a center of the vehicle 12. The vehicle-outboard chamber 24 inflates away from the vehicle-rearward and vehicle-outboard corner 20 of the seat frame 16, e.g., adjacent a rear seat 10 positioned behind the seat 10. The airbag 18 is designed to control the kinematics of an occupant seated in the rear seat 10 behind the seat 10 in possible frontal, rear, or side impacts to the vehicle 12.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the body includes a roof 26 and a floor 28 spaced from the roof 26. The roof 26 may define the upper boundary of the passenger compartment. The floor 28 may define the lower boundary of the passenger cabin and may extend from the front end of the passenger cabin to the rear end of the passenger cabin. The floor 28 may include a floor panel (not numbered) and upholstery (not numbered) on the floor 28. The upholstery may be, for example, carpet, and may have a class-A surface facing the passenger cabin, i.e., a surface specifically manufactured to have a high quality, finished, aesthetic appearance free of blemishes. The floor 28 may include crossbeams (not shown) connected to the floor panel and to other components of the body.

The vehicle 12 includes the doors 30 openable for occupants to enter and exit the passenger compartment. The roof rails contact a top edge of the doors 30 when the doors 30 are closed. Each door 30 includes a door trim, the door frame, and a door panel. The door trim and the door panel are fixed relative to the door frame. The door trim is fixed opposite the door panel relative to the door frame. The door trim is inboard relative to the door frame, and the door panel is outboard relative to the door frame. The door 30 includes a window opening, an opening completely closed by the window if the window is in a fully raised position. The window opening is defined by the door trim and door panel on a bottom edge and either by the door 30 circumscribing the window opening or by the body, e.g., the A pillar, the B pillar, and the roof rail. The door panel faces outboard relative to the vehicle 12.

The vehicle 12 may include one or more seats. Specifically, the vehicle 12 may include any suitable number of seats. As shown in FIG. 1, the seats are supported by the floor 28. The seats may be arranged in any suitable arrangement in the passenger compartment. As in the example shown in the Figures, one or more of the seats may be at the front end of the passenger compartment, e.g., a driver seat and/or a passenger seat. One or more of the seats may be spaced from the front seat 10 in a vehicle-rearward direction, e.g., toward the rear end of the passenger compartment. As used herein, any seat 10 that is vehicle-forward of another seat 10 may be a "front seat" and any seat 10 that is vehicle-rearward of another seat 10 may be a "rear seat." The seats may be movable relative to the floor 28 to various positions, e.g., movable fore-and-aft and/or cross-vehicle. The seats may be of any suitable type, e.g., a bucket seat.

With reference to FIGS. 1-5B, the seats include a seatback 14, a seat bottom (not numbered), and a head restraint 32. The head restraint 32 extends upwardly from and is supported by the seatback 14 and may be stationary or movable relative to the seat back. The seatback 14 may be supported by the seat bottom and may be stationary or movable relative to the seat bottom. The seatback 14, the seat bottom, and/or the headrest may be adjustable in multiple degrees of freedom. Specifically, the seatback 14, the seat bottom, and/or the headrest may themselves be adjustable, in other words, adjustable components within the seatback 14, the seat bottom, and/or the headrest, and/or may be adjustable relative to each other.

The seatback 14 includes the seat frame 16 and a covering 34 supported on the seat frame 16. The seat frame 16 may include tubes, beams, etc. Specifically, the seat frame 16 includes a pair of upright frame members 36. The upright frame members 36 are elongated, and specifically, are elongated in a generally upright direction when the seatback 14 is in a generally upright position. The upright frame members 36 are spaced from each other and the seat frame 16 includes one or move cross-members extending between the upright frame members 36. The seat frame 16, including the upright frame members 36, may be of any suitable plastic material, e.g., carbon fiber reinforced plastic (CFRP), glass fiber-reinforced semi-finished thermoplastic composite (organosheet), etc. As another example, some or all components of the seat frame 16 may be formed of a suitable metal, e.g., steel, aluminum, etc.

The covering 34 may include upholstery, padding, and/or plastic portions. The upholstery may be cloth, leather, faux leather, or any other suitable material. The upholstery may be stitched in panels around the seat frame 16. The padding may be between the covering 34 and the seat frame 16 and may be foam or any other suitable material.

With reference to FIGS. 1-4, the seatback 14 of the seats define an occupant seating area 38. The occupant seating area 38 is the area occupied by an occupant when seated on the seat bottom. The occupant seating area 38 is in a seat-forward direction of the seatback 14 and above the seat bottom.

The rear seat 10 defines an occupant knee area 40. The occupant knee area 40 may be vehicle-rearward of the seatback 14 of the front seat. The occupant knee area 40 is the volume typically occupied by the knees of an occupant in the rear seat 10 of the vehicle 12, i.e., an occupant in the rear seat 10 behind the front seat.

The rear seat 10 defines an occupant head area 42. The occupant head area 42 is vehicle-rearward of the seatback 14 of the front seat. The occupant head area 42 is the volume typically occupied by the head of an occupant in the rear seat 10 of the vehicle 12, i.e., an occupant in the rear seat 10 behind the front seat.

The doors 30 of the vehicle 12 are adjacent the front seats and the rear seats. Each of the front seats and each of the rear seats may be adjacent a door 30 of the vehicle 12. Specifically, each front seat 10 may be adjacent a front door 30 and each rear seat 10 may be adjacent a rear door 30. The doors 30 are vehicle-outboard from each of the front seats and each of the rear seats.

The seat 10, specifically, the front seat, may include an airbag assembly 44. The airbag assembly 44 may include a housing (not shown), an inflator 46, and the airbag 18. The inflator 46 is fluidly connected to the airbag 18. The inflator 46 expands the airbag 18 with inflation medium, such as a gas, to move the airbag 18 from an uninflated position to the inflated position. The inflator 46 may be, for example, a pyrotechnic inflator that ignites a chemical reaction to generate the inflation medium, a stored gas inflator that releases (e.g., by a pyrotechnic valve) stored gas as the inflation medium, or a hybrid.

With continued reference to FIGS. 1-4, one or more of the front seats may include the airbag assembly 44. The airbag assembly 44, i.e., the airbag 18, is supported by the seatback 14 of one or more of the front seats. Specifically, the airbag 18 is supported on a vehicle-rearward and vehicle-outboard corner 20 of the seat frame 16 of the front seat. For example, as shown in the Figures, the airbag 18 may be supported on one of upright frame members 36 of the seat frame 16 of the front seat. Specifically, the airbag 18 is supported on the vehicle-outboard upright frame member 36 of the seat frame 16 of the front seat. The seatback 14 is between the occupant seating area 38 and the airbag 18 when the airbag 18 is in the inflated position.

The airbag 18 may extend from the floor 28 to the roof 26 in the inflated position. Specifically, a bottom 48 of the airbag 18 may be at the floor 28 and a top 50 of the airbag 18 may be at the roof 26 in the inflated position. The top 50 of the airbag 18 is spaced from the bottom 48 of the airbag 18. The airbag 18 may extend generally vertically from the floor 28 to the roof 26 of the vehicle 12 when the airbag 18 is in the inflated position. Specifically, the cross-vehicle chamber 22 and the vehicle-outboard chamber 24 may be elongated generally vertically from the floor 28 to the roof 26 in the inflated position. The adverb "generally" means that the airbag 18 may slightly deviate from vertical in the inflated position due to the bulbous nature and rapid expansion of airbags 18 during inflation.

With reference to FIGS. 2-4, and 5B, the airbag 18 is inflatable from the front seat 10 and includes the cross-vehicle chamber 22 and the vehicle-outboard chamber 24. The cross-vehicle chamber 22 and the vehicle-outboard chamber 24 are at generally right angles with each other. The chambers meet at a corner positioned at the vehicle-rearward and vehicle-outboard corner 20 of the seatback 14 of the front seat. The airbag 18 may include a continuous surface extending in two planes facing an occupant of the rear seat. For example, the cross-vehicle chamber 22 may extend in a plane that is vehicle-forward of the rear seat 10 and the vehicle-outboard chamber 24 may extend in a plane adjacent the occupant in the rear seat. The continuous surface extends along both the cross-vehicle chamber 22 and the vehicle-outboard chamber 24 in the planes in front of and adjacent to the occupant in the rear seat.

The cross-vehicle chamber 22 is inflatable is behind the seatback 14 of the front seat. The seatback 14 of the front seat 10 is between the cross-vehicle chamber 22 and the occupant seating area 38 of the front seat 10 when the airbag 18 is in the inflated position. The cross-vehicle chamber 22 is between the seatback 14 of the front seat 10 and the occupant-seating area of the rear seat 10 in the inflated position. The cross-vehicle chamber 22 may abut, i.e., contact, the seatback 14 of the front seat 10 when the airbag 18 is in the inflated position. The cross-vehicle chamber 22 may use the seatback 14 of the front seat 10 as a reaction surface in the event of an impact to the vehicle 12 to control the kinematics of an occupant seated in the rear seat 10 that is behind the front seat.

The cross-vehicle chamber 22 is inflatable in the vehicle-inboard direction behind the seatback 14 of the front seat. In other words, the cross-vehicle chamber 22 inflates away from the vehicle-rearward and vehicle-outboard corner 20 of the seat frame 16 and toward the center of the vehicle 12. In the inflated position, the cross-vehicle chamber 22 extends from the vehicle-rearward and vehicle-outboard corner 20 of the seatback 14 to a vehicle-rearward and vehicle-inboard corner 52 of the seatback 14 of the front seat. Specifically, the cross-vehicle chamber 22 extends from the vehicle-rearward and vehicle-outboard corner 20 of the seat frame 16 of the front seat 10 to a vehicle-rearward and vehicle-inboard corner 52 of the seat frame 16 of the front seat 10 in the inflated position.

With reference to FIGS. 1-4, the cross-vehicle chamber 22 may be between the front seat 10 and the occupant knee area 40 defined by the rear seat. Specifically, the cross-vehicle chamber 22 is sized and shaped to extend between seatback 14 of the front seat 10 and the occupant knee area 40 of the rear seat, i.e., the area occupied by the knees of the occupant in the rear seat 10 behind the front seat. The cross-vehicle chamber 22 controls the kinematics of an occupant seated in the rear seat 10 of the vehicle 12, i.e., an occupant occupying the occupant knee area 40 defined by the rear seat 10 in the passenger compartment.

The cross-vehicle chamber 22 may be between the front seat 10 and the occupant head area 42 defined by the rear seat. Specifically, the cross-vehicle chamber 22 is sized and shaped to extend between the seatback 14 of the front seat 10 and the occupant head area 42 of the rear seat, i.e., the area occupied by the head of the occupant in the rear seat 10 behind the front seat. As discussed above, the cross-vehicle chamber 22 controls the kinematics of an occupant seated in the rear seat 10 of the vehicle 12, i.e., an occupant occupying the occupant head area 42 defined by the rear seat 10 in the passenger compartment.

With reference to FIGS. 2-4, and 5B, in the inflated position, the cross-vehicle chamber 22 extends from the vehicle-rearward and vehicle-outboard corner 20 of the seat frame 16 of the front seat to a distal end 54. The distal end 54 of the cross-vehicle chamber 22 is spaced from the vehicle-rearward and vehicle-outboard corner 20 in the vehicle-inboard direction when the airbag 18 is in the inflated position. As the airbag 18 inflates to the inflated position, the distal end 54 of the cross-vehicle chamber 22 moves away from the vehicle-rearward and vehicle-outboard corner 20 in the vehicle-inboard direction. In the inflated position, the distal end 54 of the cross-vehicle chamber 22 may be aligned with the vehicle-rearward and vehicle-inboard corner 52 of the seat frame 16 of the front seat.

The cross-vehicle chamber 22 extends upwardly relative to the seatback 14 of the front seat 10 to the top 50 of the airbag 18. The cross-vehicle chamber 22 may extend above the seatback 14 of the front seat 10 in the inflated position. In other words, the top 50 of the airbag 18 at the cross-vehicle chamber 22 may be spaced from a top of the seatback 14 of the front seat 10 when the airbag 18 is in the inflated position. As the airbag 18 inflates to the inflated position, the cross-vehicle chamber 22 may extend upwardly from the vehicle-rearward and vehicle-outboard corner 20 of the seatback 14 above the seatback 14, i.e., the top 50 of the airbag 18 moves away from the vehicle-rearward and vehicle-outboard corner 20 to the inflated position above the seatback 14.

The cross-vehicle chamber 22 extends upwardly relative to the head restraint 32 of the front seat. The cross-vehicle chamber 22 may extend above the head restraint 32 of the front seat 10 in the inflated position. In other words, the top 50 of the airbag 18 at the cross-vehicle chamber 22 may be spaced from a top of the head restraint 32 of the front seat 10 when the airbag 18 is in the inflated position. As the airbag 18 inflates to the inflated position, the cross-vehicle chamber 22 may extend upwardly from the vehicle-rearward and vehicle-outboard corner 20 of the seatback 14 above the head restraint 32, i.e., the top 50 of the airbag 18 moves away from the vehicle-rearward and vehicle-outboard corner 20 to the inflated position above the head restraint 32.

With continued reference to FIGS. 2-4, and 5B, the vehicle-outboard chamber 24 is inflatable in the vehicle-rearward direction from the vehicle-rearward and vehicle-outboard corner 20 of the front seat. In other words, the vehicle-outboard chamber 24 inflates away from the vehicle-rearward and vehicle-outboard corner 20 of the seat frame 16 of the front seat 10 toward the rear end of the passenger compartment. The vehicle-outboard chamber 24 may be adjacent an occupant seated in the rear seat 10 of the vehicle 12 when the vehicle-outboard chamber 24 is in the inflated position.

In the inflated position, the vehicle-outboard chamber 24 extends from the vehicle-rearward and vehicle-outboard corner 20 to a distal end 56. The distal end 56 of the vehicle-outboard chamber 24 is spaced from vehicle-rearward and vehicle-outboard corner 20 in the vehicle-rearward direction when the airbag 18 is in the inflated position. In the inflated position, the distal end 56 of the vehicle-outboard chamber 24 may be adjacent the rear seat. The distal end 56 of the vehicle-outboard chamber 24 moves away from the vehicle-rearward and vehicle-outboard corner 20 as the vehicle-outboard chamber 24 unrolls from the uninflated position and moves toward the inflated position.

The vehicle-outboard chamber 24 is vehicle-outboard of the rear seat 10 in the inflated position. Specifically, the distal end 56 of the vehicle-outboard chamber 24 is vehicle-outboard of the rear seat 10 in the inflated position.

The vehicle-outboard chamber 24 may be between the door 30 and the rear seat 10 when the airbag 18 is in the inflated position, e.g., the distal end 56 of the vehicle-outboard chamber 24 may be between the door 30 and the rear seat 10 when the airbag 18 is in the inflated position. In other words, the vehicle-outboard chamber 24 may be adjacent an occupant in the rear seat 10 of the vehicle 12. The rear seat 10 includes an outboard edge running adjacent the door 30. The vehicle-outboard chamber 24 may abut the outboard edge of the rear seat 10 when the airbag 18 is in the inflated position.

The cross-vehicle chamber 22 is fluidly connected to the vehicle-outboard chamber 24. In other words, the inflation medium supplied by the inflator 46 passes freely between the cross-vehicle chamber 22 and the vehicle-outboard chamber 24.

The top 50 of the airbag 18 extends from the distal end 54 of the cross-vehicle chamber 22 to the distal end 56 of the vehicle-outboard chamber 24. The bottom 48 of the airbag 18 extends from the distal end 54 of the cross-vehicle chamber 22 to the distal end 56 of the vehicle-outboard chamber 24.

In the uninflated position, the airbag 18 is concealed under the covering 34 of the seat. Specifically, the cross-vehicle chamber 22 and the vehicle-outboard chamber 24 are concealed under the covering 34 of the front seat 10. For example, the covering 34 may include tear seam 58 that is releasable when the airbag 18 is moving toward the inflated position in the event of an impact to the vehicle 12. The cross-vehicle chamber 22 and the vehicle-inboard chamber may be rolled in opposite directions to be stowed in the uninflated position. For example, the cross-vehicle chamber 22 may be rolled in a clockwise direction and the vehicle-inboard chamber may be rolled in a counterclockwise direction. As the airbag 18 moves to the inflated position, the cross-vehicle chamber 22 and the vehicle-inboard chamber unroll in the opposite direction of each other toward the inflated position. The distal end 54 of the cross-vehicle chamber 22 moves away from the vehicle-rearward and vehicle-outboard corner 20 as the cross-vehicle chamber 22 unrolls from the uninflated position and moves toward the inflated position. The distal end 56 of the vehicle-outboard chamber 24 moves away from the vehicle-rearward and vehicle-outboard corner 20 as the vehicle-outboard chamber 24 unrolls from the uninflated position and moves toward the inflated position.

The front seat 10 may include a deflector 60 supported by the seatback 14 of the front seat. The airbag 18 may abut the deflector 60 in the inflated position to direct the inflation of the cross-vehicle chamber 22 in the vehicle-inboard direction and the vehicle-outboard chamber 24 in the vehicle-rearward direction.

The airbag 18 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a front seat having a seatback, the seatback having a seat frame;
a rear seat spaced from the front seat in a vehicle-rearward direction;
an airbag supported on a vehicle-rearward and vehicle-outboard corner of the seat frame of the front seat, the airbag being inflatable to an inflated position; and
the airbag including a cross-vehicle chamber inflatable in a vehicle-inboard direction behind the front seat and a vehicle-outboard chamber inflatable in the vehicle-rearward direction vehicle-outboard of the rear seat.

2. The vehicle of claim 1, wherein the cross-vehicle chamber extends from the vehicle-rearward and vehicle-outboard corner of the seatback of the front seat to a vehicle-rearward and vehicle-inboard corner of the seatback of the front seat in the inflated position.

3. The vehicle of claim 1, wherein the rear seat includes a vehicle-outboard edge, the vehicle-outboard chamber abutting the vehicle-outboard edge in the inflated position.

4. The vehicle of claim 1, further comprising a door adjacent the rear seat, the vehicle-outboard chamber being between the door and the rear seat in the inflated position.

5. The vehicle of claim 1, wherein the rear seat defines an occupant knee area, the cross-vehicle chamber being between the front seat and the occupant knee area.

6. The vehicle of claim 1, wherein the rear seat defines an occupant head area, the cross-vehicle chamber being between the front seat and the occupant head area.

7. The vehicle of claim 1, wherein the cross-vehicle chamber is fluidly connected to the vehicle-outboard chamber.

8. The vehicle of claim 1, further comprising a deflector supported by the seatback of the front seat, the airbag abutting the deflector in the inflated position.

9. The vehicle of claim 1, further comprising a roof and a floor spaced from the roof, the airbag extending from the floor to the roof in the inflated position.

10. The vehicle of claim 1, wherein the cross-vehicle chamber extends upwardly above the seatback of the front seat in the inflated position.

11. The vehicle of claim 1, wherein the front seat includes a head restraint extending upwardly from the seatback, the cross-vehicle chamber extending upwardly above the head restraint in the inflated position.

12. A seat comprising:
a seatback having a seat frame;
an airbag supported on a vehicle-rearward and vehicle-outboard corner of the seat frame, the airbag being inflatable to an inflated position; and
the airbag including a cross-vehicle chamber inflatable in a vehicle-inboard direction behind the seatback and a vehicle-outboard chamber inflatable in a vehicle-rearward direction.

13. The seat of claim 12, wherein the cross-vehicle chamber extends from the vehicle-rearward and vehicle-outboard corner of the seat frame to a vehicle-rearward and vehicle-inboard corner of the seat frame in the inflated position.

14. The seat of claim 12, wherein the cross-vehicle chamber is fluidly connected to the vehicle-outboard chamber.

15. The seat of claim 12, further comprising an occupant knee area vehicle-rearward of the seatback, the cross-vehicle chamber being between the seatback and the occupant knee area.

16. The seat of claim 12, further comprising an occupant head area vehicle-rearward of the seatback, the cross-vehicle chamber being between the seatback and the occupant head area.

17. The seat of claim 12, wherein the seatback defines an occupant seating area, the seatback being between the cross-vehicle chamber and the occupant seating area when the airbag is in the inflated position.

18. The seat of claim 12, further comprising a deflector supported by the seatback, the airbag abutting the deflector in the inflated position.

19. The seat of claim 12, wherein the cross-vehicle chamber extends upwardly above the seatback in the inflated position.

20. The seat of claim 12, further comprising a head restraint extending upwardly from the seatback, the cross-vehicle chamber extending upwardly above the head restraint in the inflated position.

* * * * *